United States Patent [19]
Terao et al.

[11] Patent Number: 5,660,398
[45] Date of Patent: Aug. 26, 1997

[54] HYDRAULIC SEALING DEVICE

[75] Inventors: Kiminobu Terao; Mayumi Takada; Yorinori Kumagai; Takamichi Shimada, all of Saitama; Toshio Oka; Junya Nagai, both of Niigata, all of Japan

[73] Assignee: Honda Giken Kogyo Kabushiki Kaisha, Tokyo, Japan

[21] Appl. No.: 542,006

[22] Filed: Oct. 12, 1995

[30]     Foreign Application Priority Data

Nov. 8, 1994  [JP]  Japan ................. 6-273450

[51] Int. Cl.$^6$ ................................... F16J 9/14
[52] U.S. Cl. ................. 277/216; 277/59; 277/27; 277/214; 277/215; 277/220; 277/221; 92/162 R
[58] Field of Search ..................... 277/59, 27, 214, 277/215, 216, 220, 221; 192/162 R

[56]           References Cited

U.S. PATENT DOCUMENTS

| | | | |
|---|---|---|---|
| 3,186,723 | 6/1965 | Wagner | 277/59 |
| 3,259,392 | 7/1966 | Peicki et al. | 277/59 |
| 3,364,675 | 1/1968 | Dorer | 92/162 R |
| 3,544,118 | 12/1970 | Klein | 277/27 |
| 3,655,208 | 4/1972 | Walker | 277/221 |
| 4,053,163 | 10/1977 | Vegella | 277/205 |
| 4,098,515 | 7/1978 | Sakata | 277/165 |
| 4,498,681 | 2/1985 | Heinz | 277/59 |
| 4,575,107 | 3/1986 | Umegawa | 277/221 |
| 4,741,509 | 5/1988 | Bunch et al. | 277/205 |
| 5,178,400 | 1/1993 | Singh | 277/3 |
| 5,312,116 | 5/1994 | Quaglia | 277/220 |

*Primary Examiner*—William A. Cuchlinski, Jr.
*Assistant Examiner*—Christina Annick
*Attorney, Agent, or Firm*—Lyon & Lyon LLP

[57]              ABSTRACT

In a sealing device, a crank-shaped oil channel is defined in an abutment of a sealing ring for sealing between a shaft member and a housing which surrounds the shaft member and is rotatable relative the shaft member. The crank-shaped oil channel is comprised of a first oil channel portion and a second oil channel portion which extend axially, and a third oil channel portion which connects the first and second oil channel portions to each other. If the sealing ring is thermally expanded circumferentially due to a change in temperature, the sectional area of the flow path in each of the first and second oil channel portions is varied, but the sectional area of the flow path in the third oil channel portion is not substantially varied. Therefore, it is possible to leak a given amount of an oil from one side of the sealing ring through the crank-shaped oil channel to the other side, thereby preventing the wearing of the shaft member caused by foreign matter, such as an iron powder, contained in the oil.

10 Claims, 15 Drawing Sheets

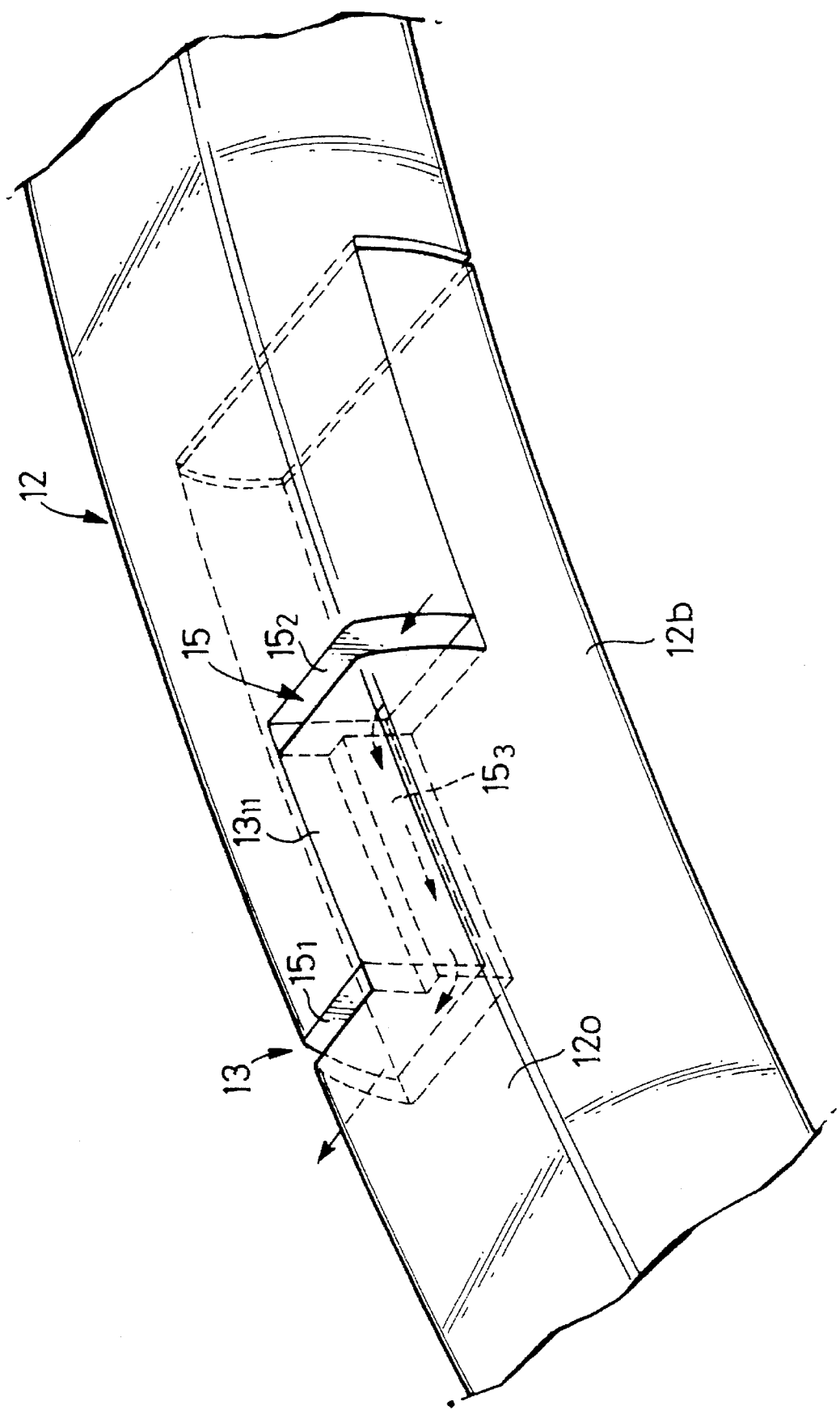

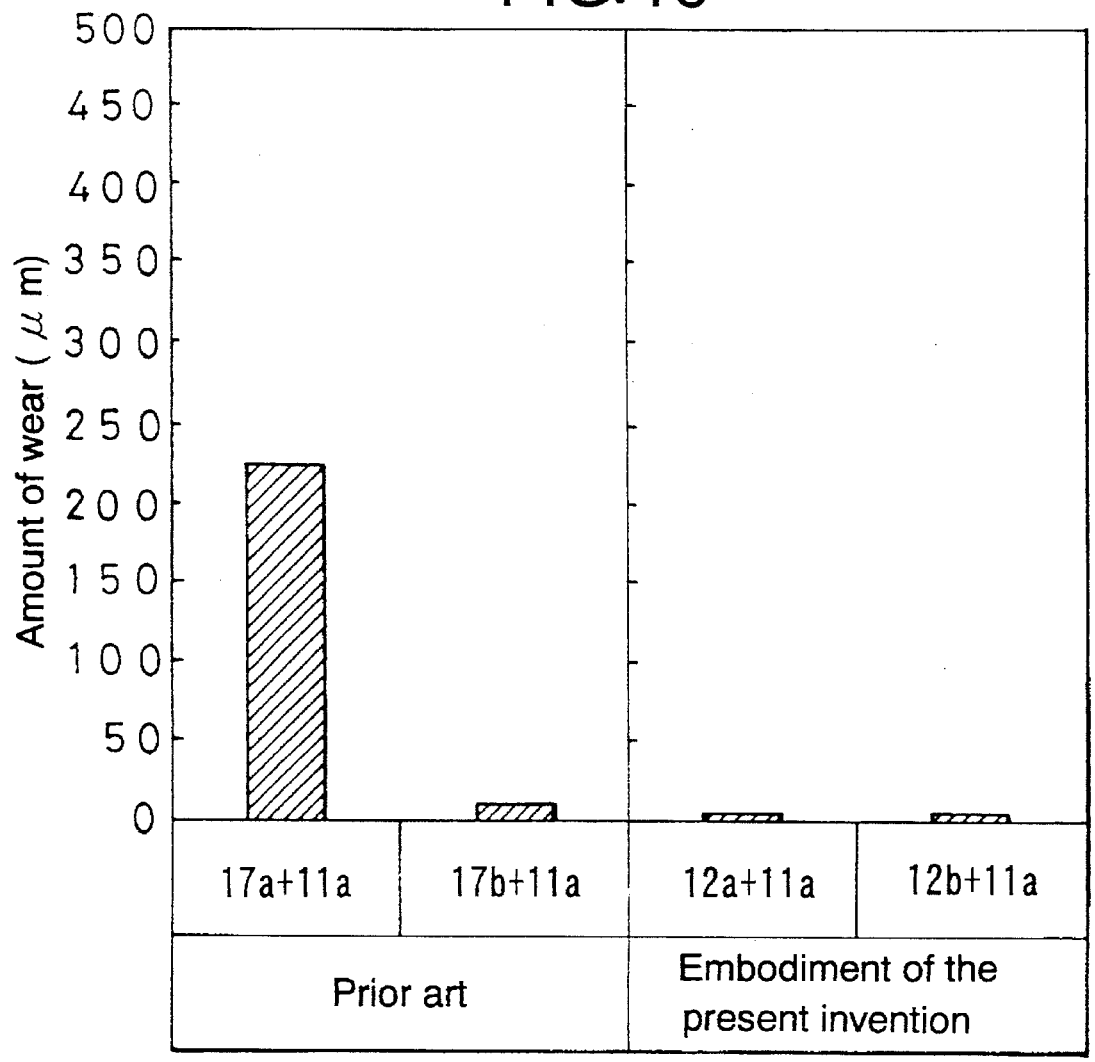

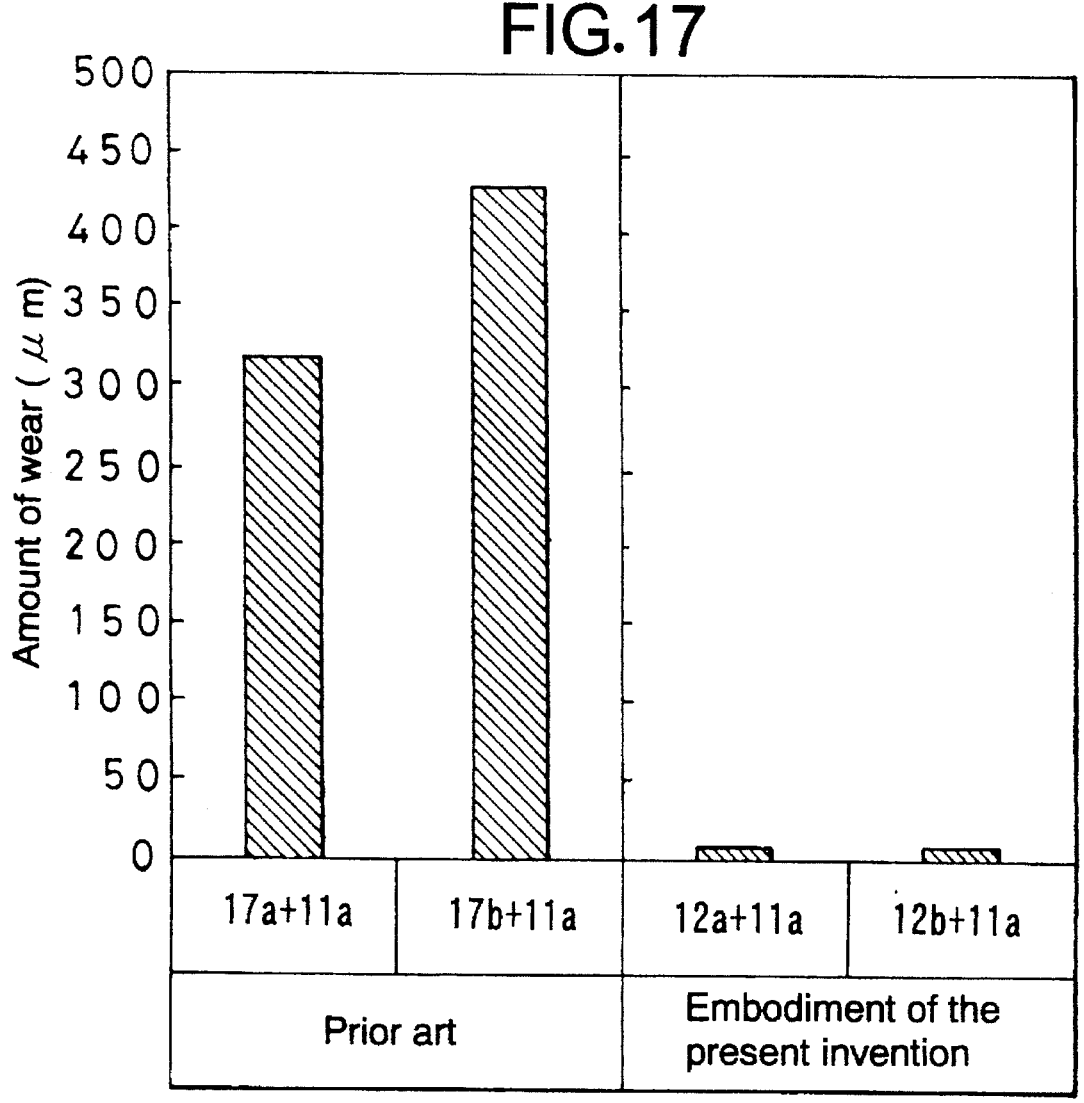

HYDRAULIC SEALING DEVICE

BACKGROUND OF THE INVENTION

1. Field of the Invention

The present invention relates to a hydraulic sealing device including a sealing ring which is mounted in an annular sealing ring groove defined in an outer periphery of a shaft member, so that it is brought into pressure contact with both a sealing inner-peripheral surface of a housing relatively rotatably fitted over the outer periphery of the shaft member and one of the sealing sides of the sealing ring groove.

2. Description of the Prior Art

Such a hydraulic sealing device is already known, as disclosed, for example, in Japanese Patent Application Laid-open No. 262171/92.

When the shaft member is made of an aluminum alloy which is easily worn, there is a problem that the sealing sides of the sealing ring groove abutting against the sealing ring are worn quickly, and this wearing is considerably increased if a hard foreign matter such as an iron powder is contained in the working oil. Therefore, if a small amount of the oil is leaked from an abutment of the sealing ring for washing away the foreign matter along with such leaked oil, the foreign matter can not easily be caught between the sealing ring and the sealing sides of the sealing ring groove and hence, it is possible to effectively avoid the wearing.

A hydraulic sealing device is also known from Japanese Utility Model Application Laid-open No. 41153/92, in which the shape of an abutment of a sealing ring is of a so-called triple-stitch type having overlapped portions axially and radially. In this sealing ring, the abutment is always locked, leading to an enhanced sealability, as compared with a sealing ring having an abutment of a straight shape.

However, in the shape of the abutment of the sealing ring described in Japanese Patent Application Laid-open No. 262171/92, there is a problem that the sectional area of a flow path in the abutment is varied substantially due to the thermal expansion of the sealing ring attendant to a change in temperature and as a result, it is difficult to stably leak a given amount of the oil. In addition, if a sealing ring having the shape of the abutment described in Japanese Utility Model Application Laid-open No. 41153/92 is to be produced by an injection molding process, an arm circumferentially protruding from the abutment is stuck to and pulled by a stationary die, whereby the arm is deformed. When the sealing ring having the deformed arm is mounted in the sealing ring groove and used, there is a possibility that the amount of oil leaked is unstable, and the foreign matter intrudes into between the arm and the sealing ring, thereby causing an abnormal wearing.

SUMMARY OF THE INVENTION

Accordingly, it is an object of the present invention to permit a given amount of an oil to be always stably leaked from the abutment of the sealing ring, irrespective of the change in temperature, thereby preventing the wearing caused by the foreign matter, and to prevent the arm of the abutment from being deformed in the injection molding of the sealing ring, thereby enhancing the sealability and durability of the sealing device.

To achieve the above object, according to the present invention, there is provided a sealing device comprising a sealing ring which is mounted in an annular sealing ring groove provided in a recessed manner in an outer periphery of a shaft member, and which includes a ring inner-peripheral surface facing radially inwardly, a ring outer-peripheral surface facing radially outwardly, a pair of ring sides facing in axially opposite directions, and an abutment formed at circumferentially one point of the sealing ring, the ring outer-peripheral surface being put into pressure contact with a sealing inner-peripheral surface of a housing which is relatively rotatably fitted over the outer periphery of the shaft member, one of the ring sides being put into pressure contact with the sealing side of the sealing ring groove by a hydraulic pressure applied to the other ring side, wherein the abutment defines a crank-shaped oil channel which permits the ring sides to communicate with each other on the side of the ring outer-peripheral surface, the crank-shaped oil channel comprising first and second oil channel portions extending axially to open into the ring sides, respectively, and a third oil channel portion extending circumferentially to connect the first and second oil channel portions to each other.

With the above construction, even if the sealing ring is thermally expanded circumferentially, the sectional area of a flow path of the third channel portion of the crank-shaped oil channel is not substantially varied. Thus, it is possible to stabilize the amount of oil leaked from the other ring side of the sealing ring through the crank-shaped oil channel to the one ring side, thereby avoiding the wearing of the sealing side of the sealing ring groove caused by foreign matter contained in the oil. In addition, since the crank-shaped oil channel opens to the ring outer-peripheral surface of the sealing ring, the opening area of the crank-shaped oil channel facing the sealing side of the sealing ring groove is decreased, thereby enabling the wearing of the sealing side to be further effectively avoided.

If an opening in the third oil channel portion facing the sealing inner-peripheral surface of the housing is closed by a closing wall extending to the ring outer-peripheral surface, the closing wall resists the hydraulic pressure applied to the other ring side of the sealing ring, thereby making it possible to prevent the decrease in sectional area of the flow path of the third oil channel portion of the crank-shaped oil channel by the hydraulic pressure.

If the one ring side put into pressure contact with the sealing side of the sealing ring groove is formed into a convex curved surface having a radially central portion increased, the ring side can be always put into contact with the sealing side to provide an enhanced sealing effect.

If the shaft member is made of an aluminum alloy, the wear-preventing function exhibited by the crank-shaped oil channel can be effectively utilized.

If sealing ring is made of a synthetic resin, it is possible to tightly contact and engage the ring outer peripheral surface and the one ring side with the seal inner-peripheral surface of the housing and the seal side of the seal ring groove, respectively, thereby improving sealing property.

Further, an arm circumferentially protruding from one of the end faces of the sealing ring may be provided, the arm being formed by the one ring side, the ring outer-peripheral surface, a wall surface extending halfway between the ring outer- and inner-peripheral surfaces, a wall surface forming the first oil channel portion opening into the one ring side, and a wall surface forming the third oil channel portion, the arm being located at a side of a movable die of a mold which is axially opened and closed for injection molding the sealing ring. With this arrangement, when the mold is opened, the arm cannot be stuck to the stationary die and deformed.

The above and other objects, features and advantages of the invention will become apparent from the following

BRIEF DESCRIPTION OF THE DRAWINGS

FIG. 11 is a perspective view of the abutment of the sealing ring of FIGS. 8 to 10 in a mounted state;

FIGS. 16 and 17 are graphs illustrating the amount of sealing ring groove wear for the prior art and an embodiment of this invention.

DESCRIPTION OF THE PREFERRED EMBODIMENTS

A first embodiment of the present invention will now be described with reference to FIGS. 1 to 7.

Figure 1:
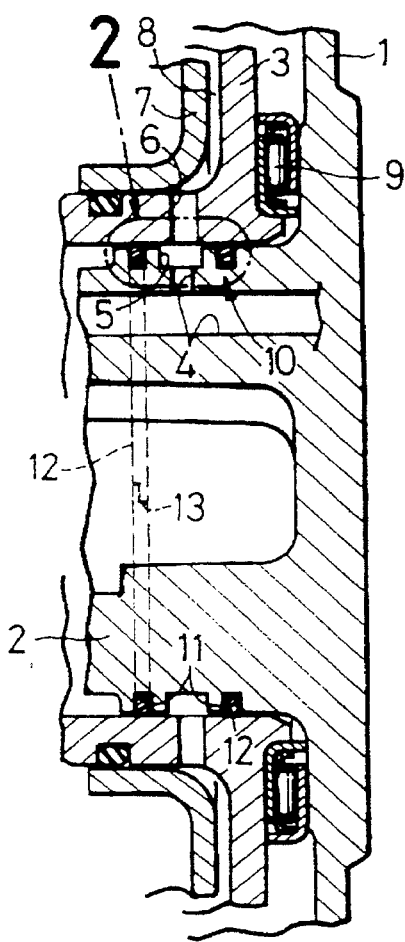
FIG. 1 is a vertical sectional view of hydraulic equipment including a hydraulic sealing device according to a first embodiment of the present invention.
Figure 2:
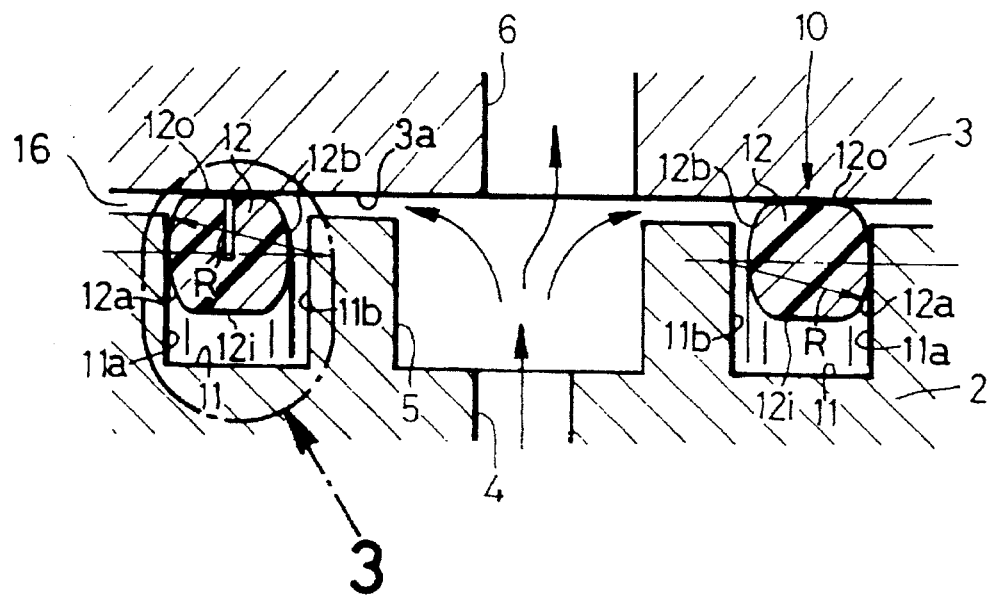
FIG. 2 is an enlarged view of a portion indicated by the oval line 2 in FIG. 1.

Referring to FIGS. 1 and 2, a shaft member 2 is integrally provided on an inner wall of a stationary casing 1 to protrude therefrom, such as in an automatic transmission of an automobile. A housing 3 is rotatably fitted over an outer periphery of the shaft member 2, and a thrust bearing 9 is interposed between the casing 1 and the housing 3.

An oil passage 4 is provided in the shaft member 2. An upstream portion of the oil passage 4 is connected to a hydraulic pressure source such as an oil pump (not shown) through a control valve (not shown), and a downstream portion of the oil passage 4 is in communication with an oil passage 6 in the housing 3 through an annular channel 5 provided in an outer periphery of the shaft member 2. The oil passage 6 is connected to a hydraulic pressure chamber 8 is an hydraulic actuator 7 for a hydraulic clutch or the like provided in the housing 3. Thus, if a hydraulic pressure in the hydraulic pressure source is supplied to the oil passage 4, it can be transferred via the annular channel 5 and the oil passage 6 into the hydraulic pressure chamber 8 to operate the hydraulic actuator 7.

A small clearance is provided between opposed peripheral surfaces of the shaft member 2 and the housing 3 for permitting the relative rotation of the shaft member 2 and the housing 3. In order to prevent the hydraulic pressure from being leaked from the annular channel 5 through that small clearance to the outside to the utmost degree, the following hydraulic sealing device 10 is provided.

A pair of sealing grooves 11, 11 are provided in the outer periphery of the shaft member 2 and arranged on opposite sides of the annular channel 5, and sealing rings 12, 12 are mounted in the sealing grooves 11, 11. Each of the sealing rings 12 has a single split or abutment 13, so that the sealing ring 12 is mounted in the sealing groove 11 by opening the abutment 13.

The shaft member 2 is made of an aluminum alloy, and the housing 3 is made from a steel plate. The sealing ring 12 is made of a synthetic resin having a predetermined resilience. Suitable examples of such synthetic resins are PES (polyether sulfon), PPS (polyphenylene sulfide), PEEK (polyether ether ketone), PI (polyimide), PAS (polyallyl sulfon) and the like. Particularly, a synthetic resin having a hardness $H_{RM}$ of 80 to 120, a tensile strength of 700 to 1,800 kg f/cm$^2$ and a continuously heat-resisting temperature of 180° c. or more may be used.

Figure 3:
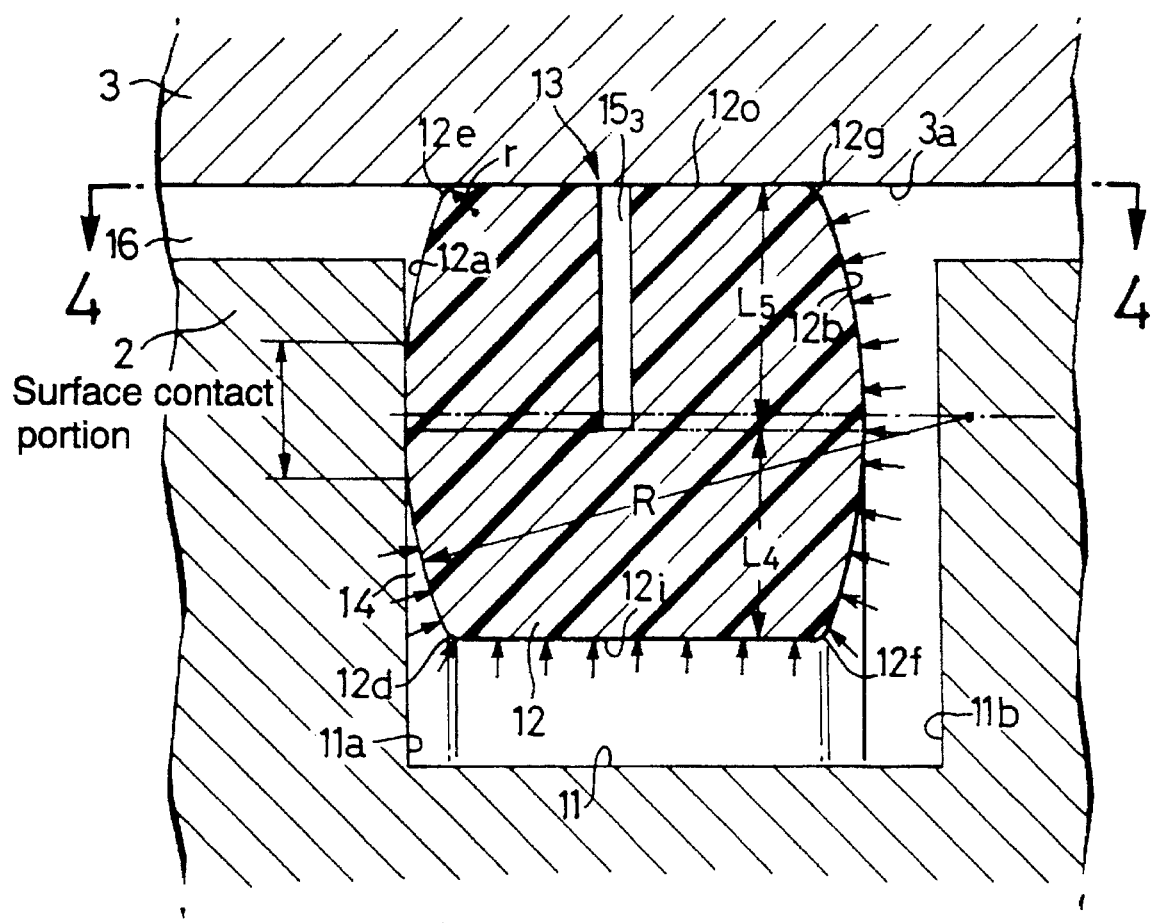
FIG. 3 is a further enlarged view of a portion indicated by the oval line 3 in FIG. 2 and also is a sectional view taken along a line 3—3 in FIG. 4.

As shown in FIG. 3, axially opposite sides 11a and 11b of each sealing groove 11 are formed flat. One side 11a of the sides 11a and 11b which is located at an outer position with respect to the annular channel 5 is called a sealing side of the sealing groove 11, and the opposite side 11b is called a non-sealing side.

Ring inner- and outer-peripheral surfaces 12i and 12o located on radially inner and outer sides of the sealing ring 12 made of the synthetic resin are formed into concentrical cylindrical surfaces, and a pair of ring sides located on axially opposite sides of the sealing ring 12 are crowned into a convex curved surface with a radially central portion being increased, whereby the cross-sectional shape of the sealing ring 12 is of a barrel shape. The radius R of curvature of the convex curved surface is set in a range of 3 to 130 mm, and most desirably at approximately 11 mm.

Corners 12d to 12g, at which the ring inner- and outer-peripheral surfaces 12i and 12o and the ring sides 12a and 12b of the sealing ring 12 intersect each other, are rounded.

The sealing ring 12 is formed into a size with an outside diameter slightly larger than an inside diameter of the housing 3 in a free state of the sealing ring 12, so that when the sealing ring 12 is mounted in the sealing ring groove 11, the ring outer-peripheral surface 12o of the sealing ring 12 comes into substantially close contact with a sealing inner-peripheral surface 3a of the housing 3.

The shape of the abutment 13 formed in the sealing ring 12 will be described below with reference to FIGS. 2 to 6.

At the opposite ends of the sealing ring 12 opposed to each other on the opposite sides of the abutment 13, a crank-shaped oil channel 15 is defined so as to intersect the ring outer-peripheral surface 12o. One of the ends of the sealing ring 12 has a first wall surface $13_1$, a second wall surface $13_2$, a third wall surface $13_3$, a fourth wall surface $13_4$ and a fifth wall surface $13_5$. The other end has a sixth wall surface $13_6$, a seventh wall surface $13_7$, an eighth wall surface $13_8$, a ninth wall surface $13_9$ and a tenth wall surface $13_{10}$.

The fourth and ninth wall surfaces $13_4$ and $13_9$ extending axially and circumferentially are in close contact with each other and can be circumferentially slid relative to each other by a thermal expansion of the sealing ring 12 attendant to a change in temperature. In order to permit the thermal expansion of the sealing ring 12 attendant to the change in temperature during this time, a small circumferential clearance is provided between the fifth and tenth wall surfaces $13_5$ and $13_{10}$ extending axially and radially and that are opposed to each other.

The first, second and third wall surfaces $13_1$, $13_2$ and $13_3$ are formed into a crank-shape and define the crank-shaped oil channel 15 by cooperation with the sixth, seventh and eighth wall surfaces $13_6$, $13_7$ and $13_8$ which are likewise formed into a crank-shape. The crank-shaped oil channel 15 is comprised of a pair of first and second oil channel portions $15_1$ and $15_2$ which extend axially and open through the opposite ring sides 12a and 12b, and a third oil channel portion $15_3$ which extends circumferentially and is connected to the first and second oil channel portions $15_1$ and $15_2$.

Figure 4:
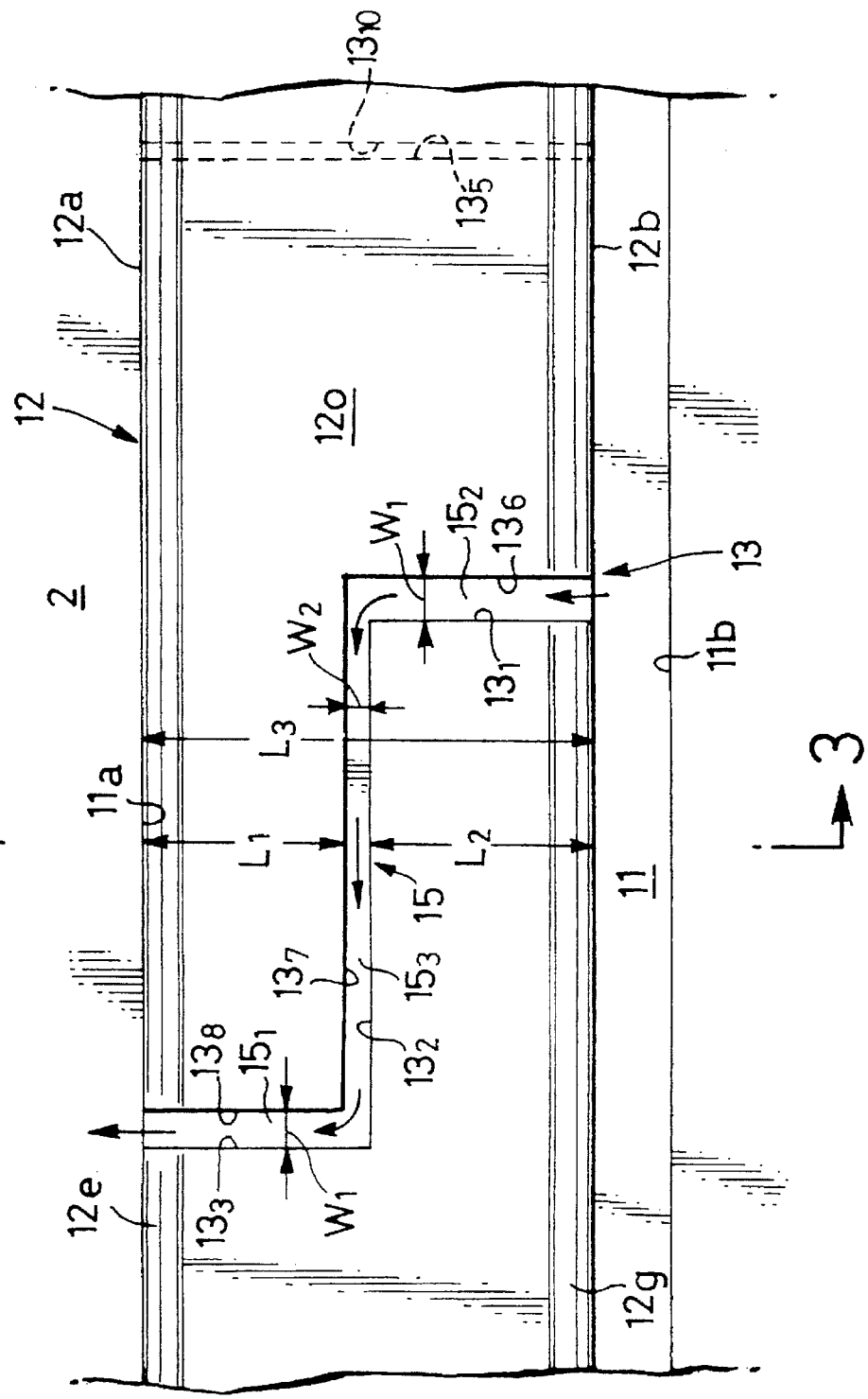
FIG. 4 is a view taken along a line 4—4 in FIG. 3.
Figure 5:
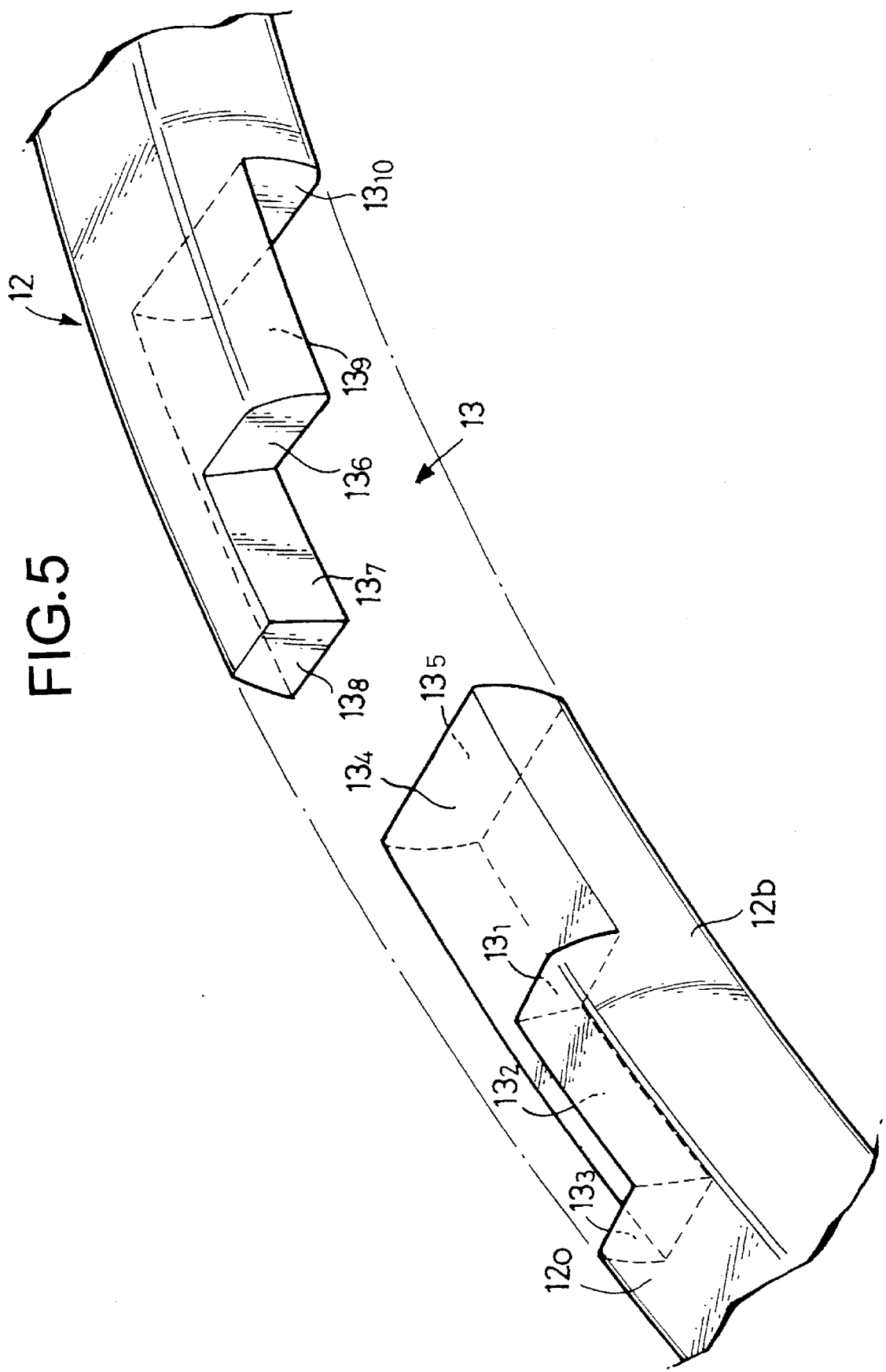
FIG. 5 is a perspective view of an abutment of a sealing ring in a free state.
Figure 6:
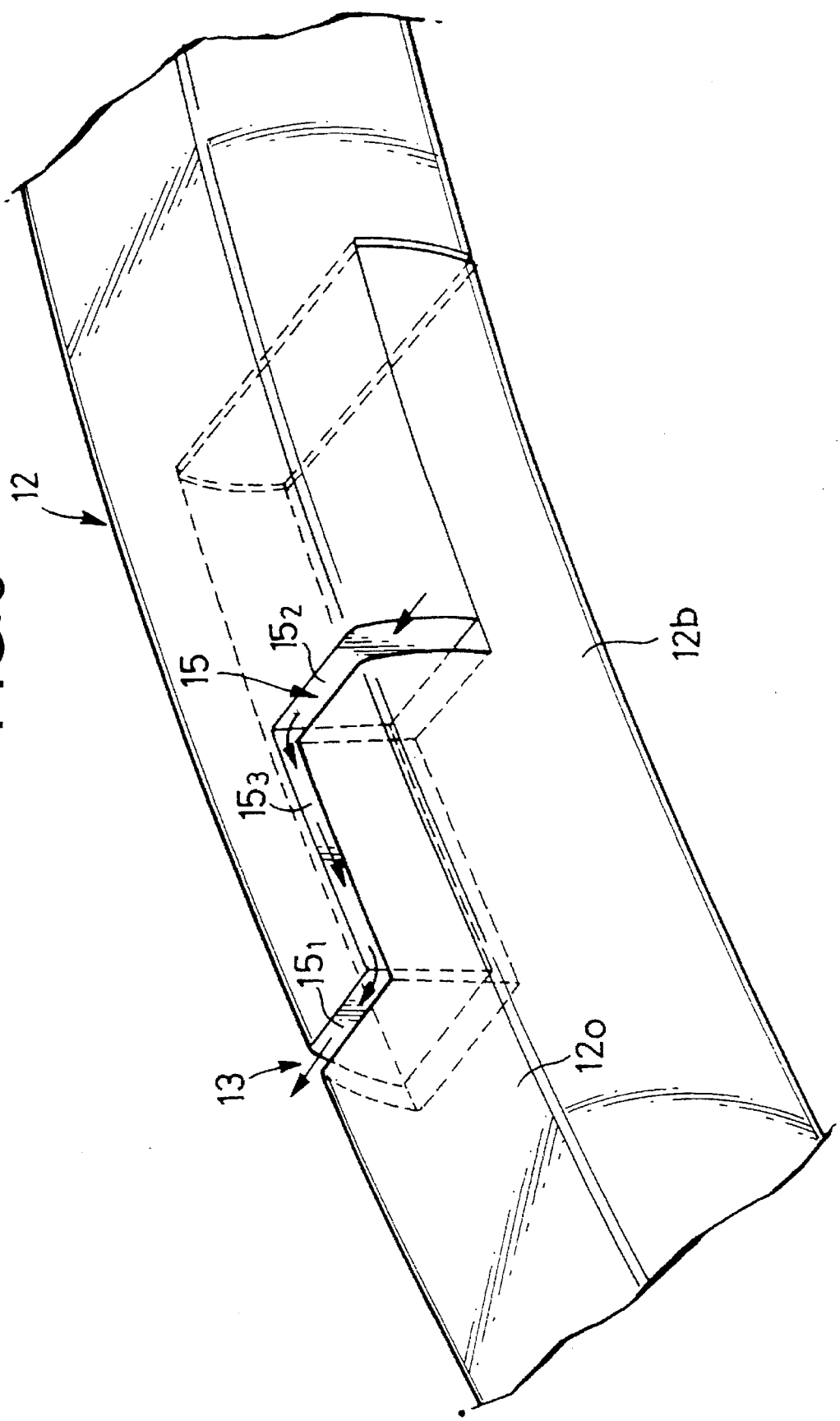
FIG. 6 is a perspective view of the abutment of the sealing ring in a mounted state.

As can be seen from FIG. 4, both the second oil channel portion $15_2$ between the first and sixth wall surfaces $13_1$ and $13_6$ and the first oil channel portion $15_1$ between the third and eighth wall surfaces $13_3$ and $13_8$ have a relatively large circumferential width $W_1$ (about 1 mm) which is increased or decreased in accordance with the thermal expansion of the sealing ring 12 attendant to the change in temperature.

The third oil channel portion $15_3$ between the second and seventh wall surfaces $13_2$ and $13_7$ has a relatively small axial width W2 (about 0.03 to 0.6 mm). Thus, if the distance between one of the ring sides 12a and the seventh wall surface $13_7$ is represented by $L_1$; the distance between the other ring side 12b and the second wall surface $13_2$ is represented by $L_2$, and the distance (the axial width of the sealing ring 12) between the opposite ring sides 12a and 12b is represented by $L_3$, a relation, $L_3-L_1-L_2=W_2$ is established. The axial width $W_2$ of the third oil channel portion $15_3$ is kept constant irrespective of the change in temperature of the sealing ring 12.

As can be also seen from FIG. 3, if the distance between the ring inner-peripheral surface 12i and the fourth wall surface $13_4$ is represented by $L_4$, and the distance between the ring outer-peripheral surface 12o and the ninth wall surface $13_9$ is represented by $L_5$, it is desirable that $L_5$ is set slightly larger than $L_4$. In other words, the depth $L_5$ of the crank-shaped oil channel 15 is slightly larger than half of the distance (the radial thickness or width of the sealing ring 12) between the ring inner-peripheral surface 12i and the ring outer-peripheral surface 12o.

The operation of this embodiment now will be described.

Referring to FIG. 1, when the housing 3 is rotated relative to the shaft member 2, the hydraulic pressure of the oil supplied from the oil pump and the hydraulic pressure generated by the centrifugal force are transferred to each of the sealing ring grooves 11 and applied to the ring inner-peripheral surface 12i and the other ring side 12b of each sealing ring 12. This causes ring outer-peripheral surface 12o of the sealing ring 12 to be brought into pressure contact with the sealing inner-peripheral surface 3a of the housing 3, and causes the one ring side 12a to be brought into pressure contact with the sealing side 11a of the sealing ring groove 11, thereby exhibiting sealing effect. In such a condition, a frictional torque generated between the ring outer-peripheral surface 12o of each sealing ring 12 and the sealing inner-peripheral surface 3a of the housing 3 is larger than a frictional torque generated between the ring side 12a of the sealing ring 12 and the sealing side 11a of the sealing ring groove 11 and hence, the sealing ring 12 is rotated to follow the housing 3 to cause the relative rotating/sliding movements between the ring side 12a and the sealing side 11a.

At this time, a triangular clearance 14 has been provided radially inside the pressure-contact portions of the flat sealing side 11a and the ring side 12a which is a convex curved surface, and the oil entering this clearance 14 tends to advance within the clearance 14 in a direction of inclination at a certain angle in the direction of rotation of the sealing ring 12 from a radial line by its own pressure and a rotative force and a centrifugal force received from the sealing ring 12. Namely, the oil tends to advance as if a wedge having a more acute angle than an apex angle of the triangular clearance 14 enters between the sealing side 11a and the ring side 12a and thus, the formation of an oil film at the contact portions of the sealing side 11a and the ring side 12a is promoted by such an oil wedge effect.

The sealing ring 12 made of the synthetic resin has a predetermined resilience and hence, when the one ring side 12a as a convex curved surface is urged toward the sealing side 11a as a flat surface by the hydraulic pressure received by the other ring side 12b, a portion of the convex curved surface of the ring side 12a is compressed and deformed to come into surface contact with the sealing side 11a. Therefore, the contact pressure is reduced by an increase in contact area and thus, it is possible to further satisfactorily perform the formation and maintaining of the oil film between the sealing side 11a and the ring side 12a.

Figure 7:
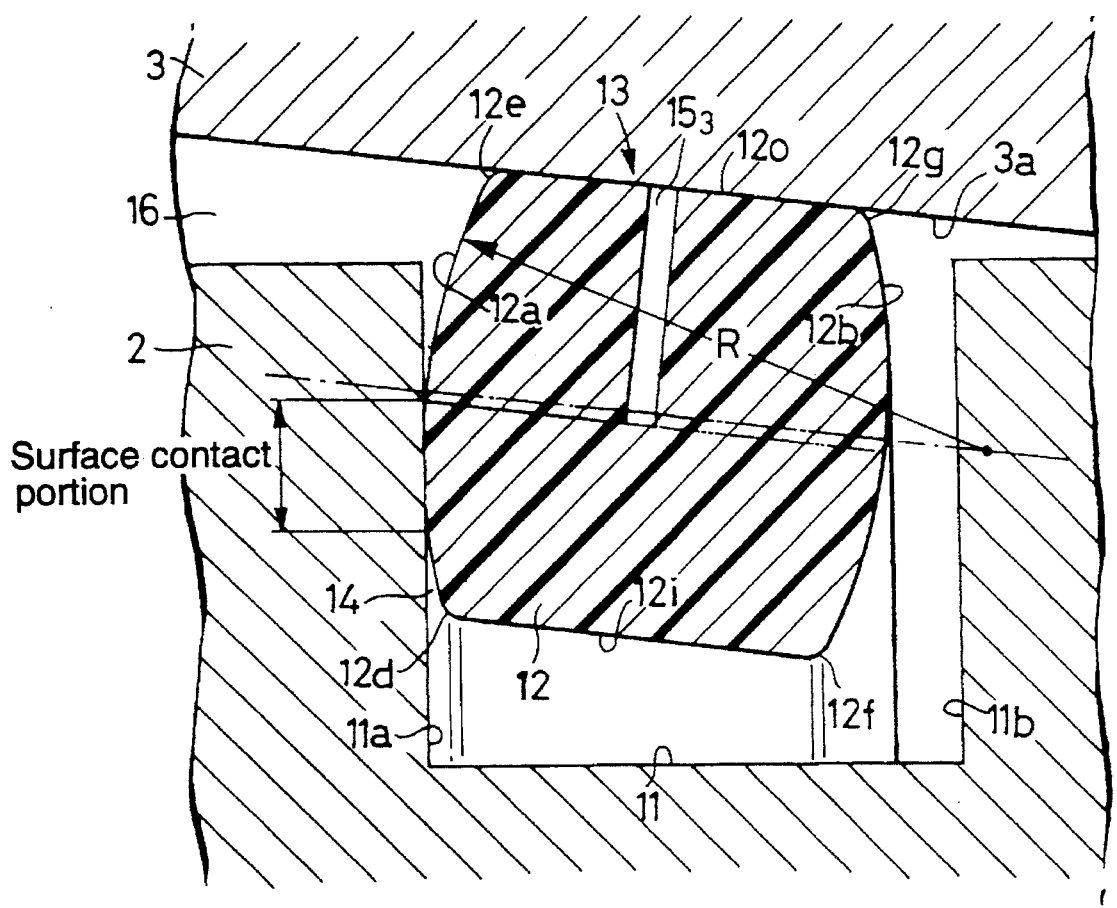
FIG. 7 is a view similar to FIG. 3 for explaining a sealing effect in a condition in which a shaft member and a housing are inclined with respect to each other.
Figure 8:
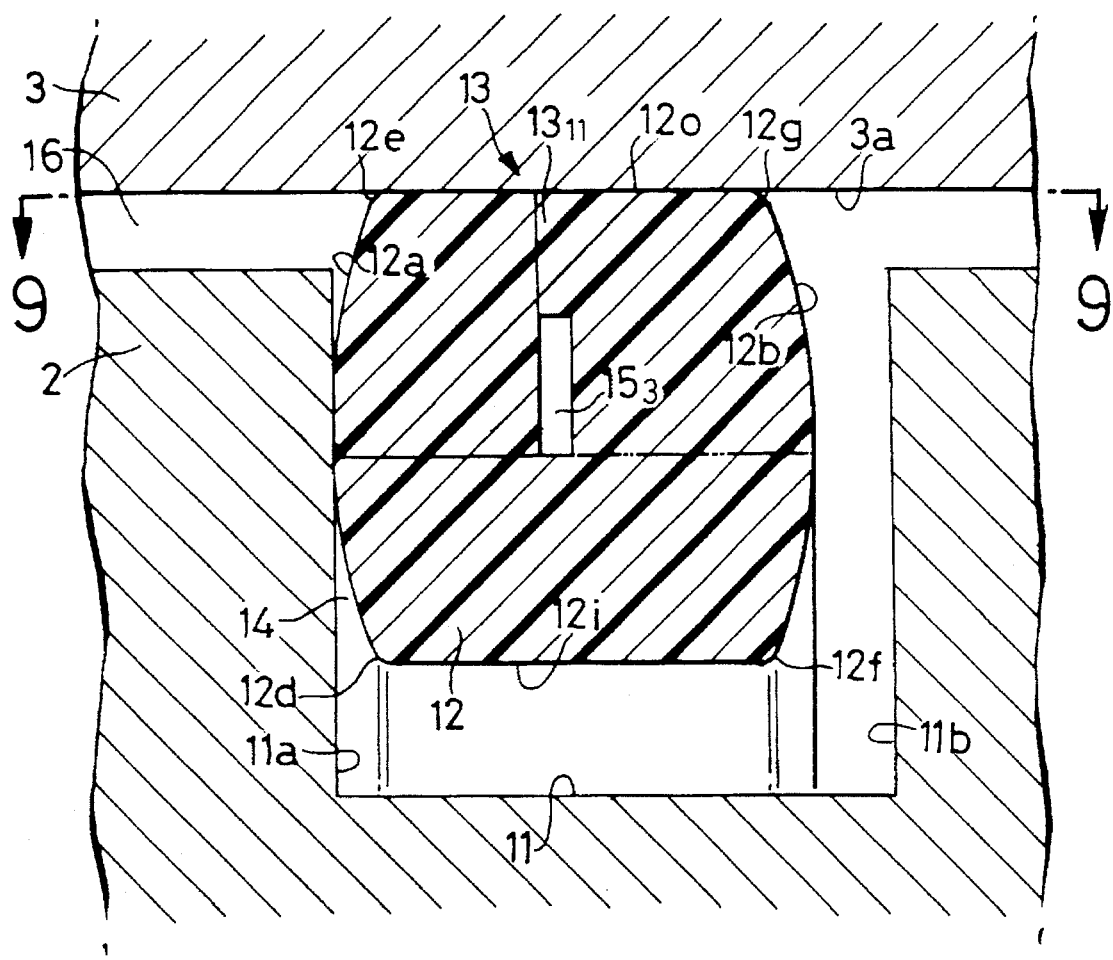
FIG. 8 is a sectional view similar to FIG. 3, but illustrating a second embodiment of the present invention and also is a sectional view taken along a line 8—8 in FIG. 9.

When the shaft member 2 and the housing 3 are inclined relative to each other for any reason, as shown in exaggerate from FIG. 7, the sealing ring 12 is torsionally deformed so as to follow the inclination by the hydraulic pressure received by the ring inner-peripheral surface 12i, thereby making it possible to maintain the surface-contact state free from a clearance between the ring outer-peripheral surface 12o of the sealing ring 12 and the sealing inner-peripheral surface 3a of the housing 3 and to continuously normally exhibit an outer-peripheral sealing function. The contact portion of the ring side 12a in the form of a convex curved surface is only shifted so as to be rolled on the sealing side 11a in the form of the flat surface, and the surface-contact state is not changed, thereby making it possible to continuously normally exhibit even a side sealing function.

When the inclination of the shaft member 2 and the housing 3 with respect to each other is too large, the corners 12d and 12e at which the ring side 12a and the ring inner-peripheral surface 12i and the ring outer-peripheral surface 12o intersect each other is brought into contact with the sealing side 11a of the sealing ring groove 11 in response to the advancement of the torsional deformation of the sealing ring 12. However, since the corners 12a and 12e are rounded, such contact does not become an edge contact state, and the corners 12a and 12e can be smoothly rotated and slid on the flat sealing side 11a without cutting the oil film.

In the described condition in which the sealing ring 12 has been mounted in the sealing ring groove 11, a portion of the oil within the sealing ring groove 11 flows through the crank-shaped oil channel 15 defined in the sealing ring 12 into a leak oil passage 16 (see FIG. 3) defined between the outer peripheral surface of the shaft member 12 and the sealing inner peripheral surface 3a of the housing 3. Thus, the sealing side 11a of the sealing ring groove 11 defined in the shaft member 1 made of the aluminum alloy can be prevented from being worn by such leaked oil.

More specifically, a hard foreign matter such as an iron powder may be included in the oil, and if the oil containing such foreign matter leaks from between the ring side 12a of the sealing ring 12 and the sealing side 11a of the sealing ring groove 11, the hard foreign matter pierces the ring side 12a of the sealing ring 12 to wear the sealing side 11a made of the aluminum alloy. However, if the oil containing such a foreign matter flows through the crank-shaped oil channel 15, the oil is not passed through between the ring side 12a and the sealing side 11a, and as a result, the wearing of the sealing side 11a made of the aluminum alloy is prevented.

When the sealing ring 12 thermally expands or shrinks due to a change in temperature, the circumferential width $W_1$ of the first and second oil channel portions $15_1$ and $15_2$ of the crank-shaped oil channel 15 is changed, but the axial width W2 of the third oil groove portion $15_3$ is not influenced by the change in temperature and is kept constant. Thus, it is possible to maintain the amount of oil flowing through the third oil channel portion $15_3$ constant. In addition, since the crank-shaped oil channel 15 is defined only in the ring outer-peripheral surface 12o of the sealing ring 12 which is in sliding contact with the sealing inner-peripheral surface 3a of the housing 3, the size of the opening of the first oil channel portion $15_1$ of the crank-shaped oil channel 15 which faces the surface contact portion (see FIG. 3) of the sealing ring groove 11 can be reduced, and the wearing of the sealing side 11a by any foreign matter contained in the oil passing through the opening can be avoided to the utmost.

A second embodiment of the present invention will now be described with reference to FIGS. 8 to 11.

In a sealing ring 12 in the second embodiment, a third oil channel portion $15_3$ of a crank-shaped oil channel 15 does not open into a ring outer-peripheral surface 12o but is closed in a tunnel-like configuration by a closing wall $13_{11}$ extending in a flush manner from the second wall surface $13_2$ to the ring outer-peripheral surface 12o. The other structures are the same and are numbered the same as in the first embodiment, whereby they will not be described again. Alternatively, the closing wall $13_{11}$ may be provided on the seventh wall surface $13_7$, in place of being provided on the second wall surface $13_2$ as in the embodiment.

Figure 9:
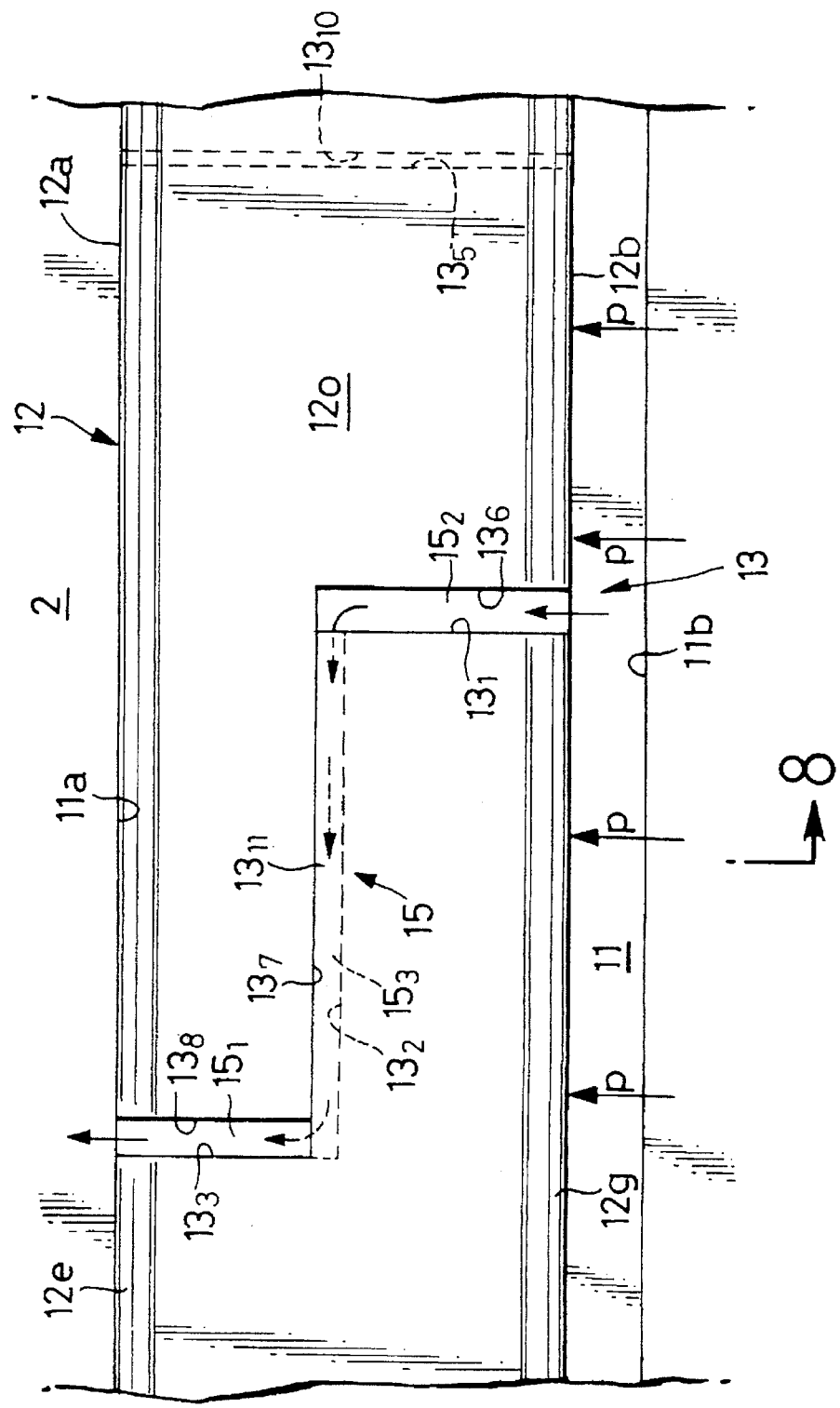
FIG. 9 is a view taken along a line 9—9 in FIG. 8.
Figure 10:
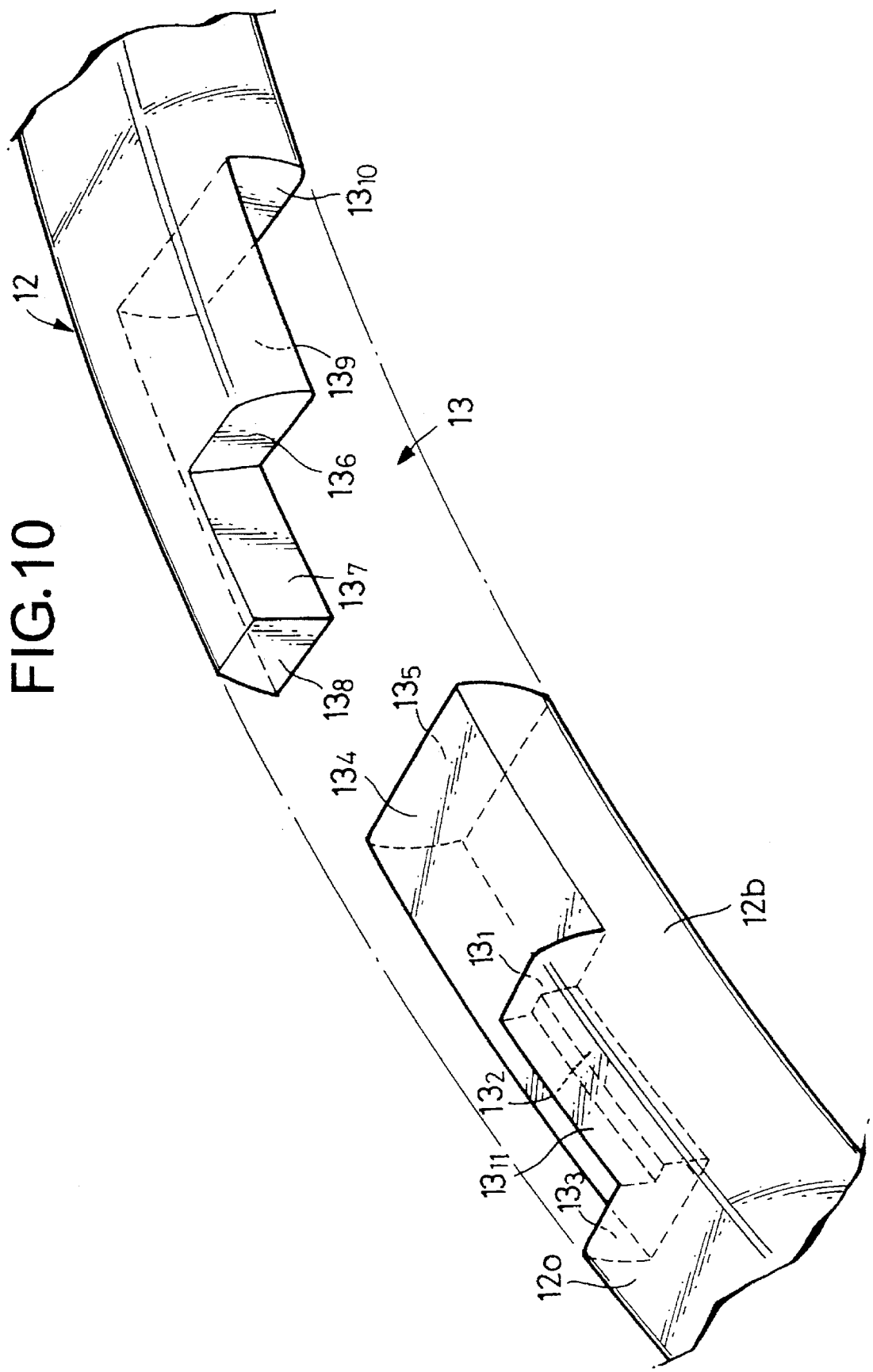
FIG. 10 is a perspective view of an abutment of the sealing ring of FIGS. 8 and 9 in a free state.

In the second embodiment, when a hydraulic pressure is applied to the other ring side 12b of the sealing ring 12, as shown by the arrow "p" in FIG. 9, the width of the third oil channel portion $15_3$ of the crank-shaped oil channel 15 can be prevented from being reduced by supporting the load of the hydraulic pressure by the closing wall $13_{11}$. Therefore, the second embodiment is particularly effective for use under a high pressure.

The preferred parting of a mold for producing a sealing ring 12 by an injection molding process will be described below with reference to FIGS. 12 to 15.

Figure 12A:
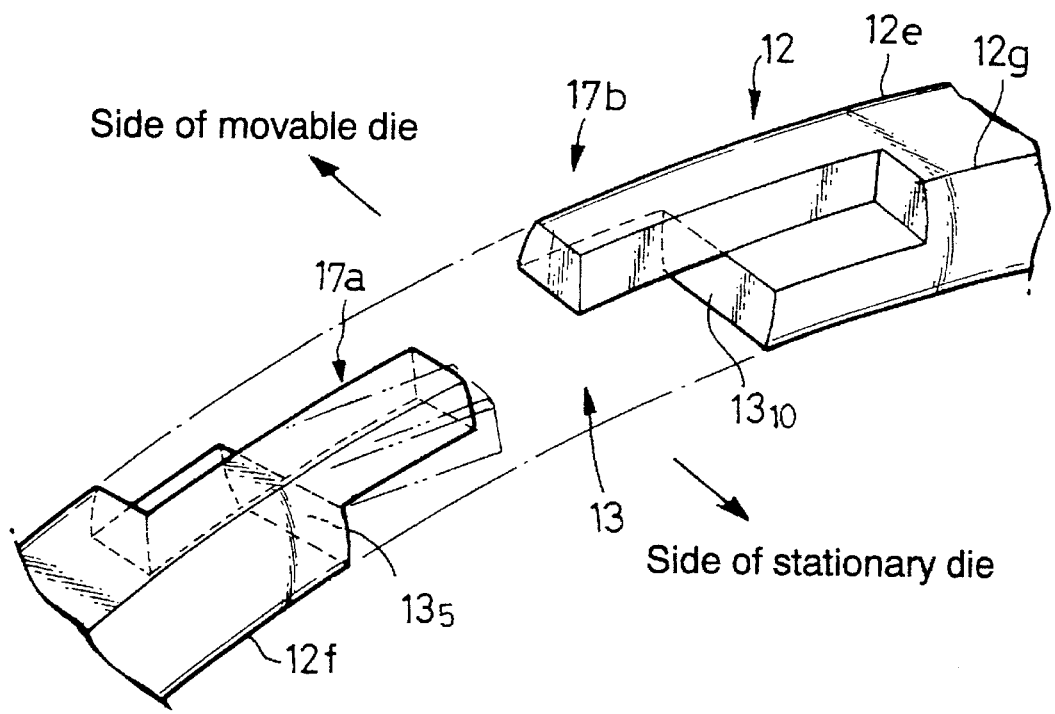
FIGS. 12A, 12B and 13 are views for explaining the preferred parting of a mold for injection molding of a conventional sealing ring.
Figure 14:
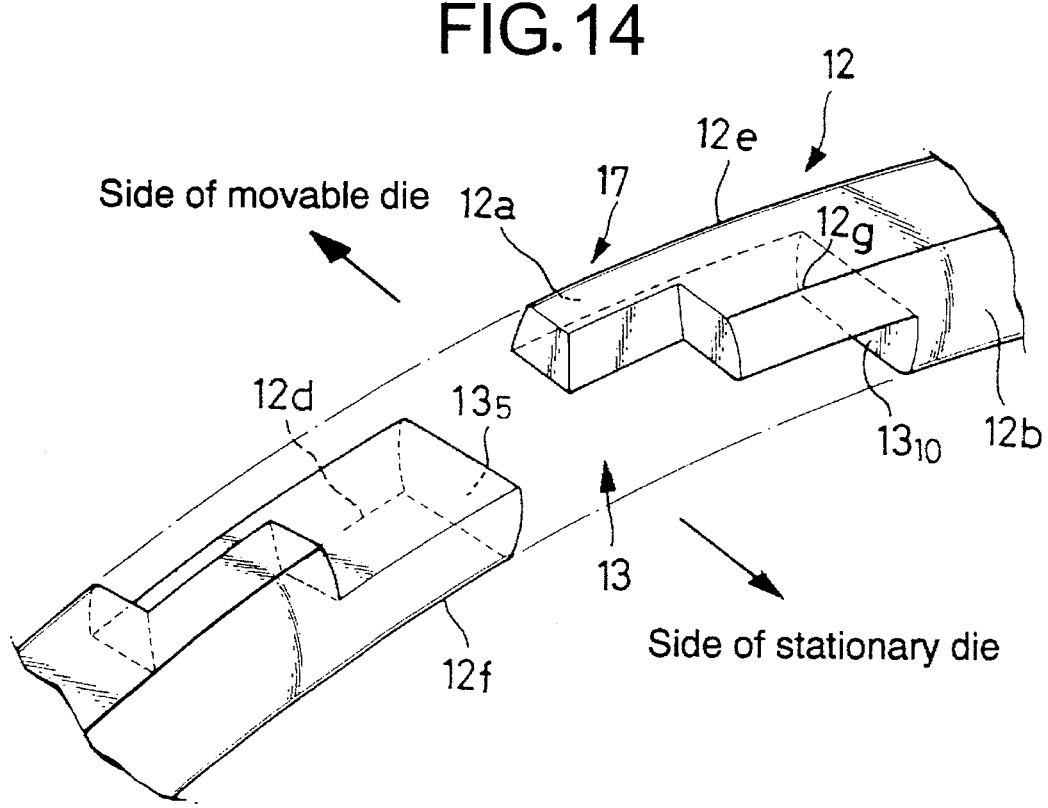
FIG. 14 is a view for explaining the preferred parting of a mold for injection molding of a sealing ring according to the present invention.

FIG. 14 illustrates the abutment 13 of the sealing ring 12 in the first embodiment. The circumferentially displaced positions of the fifth and tenth wall surface $13_5$ and $13_{10}$ of the abutment 13 are shown in FIG. 12A. As can be seen by comparison of FIGS. 14 and 12A, in the sealing ring of this invention shown in FIG. 14, only one arm 17 of a narrow width having a lower rigidity is formed at one of the ends of the sealing ring 12 which comprise the abutment 13, while in the conventional sealing ring 12 shown in FIG. 12A, two arms 17a and 17b of a narrow width having a lower rigidity are formed at opposite ends of the sealing ring 12 which comprise the abutment 13.

Figure 15:
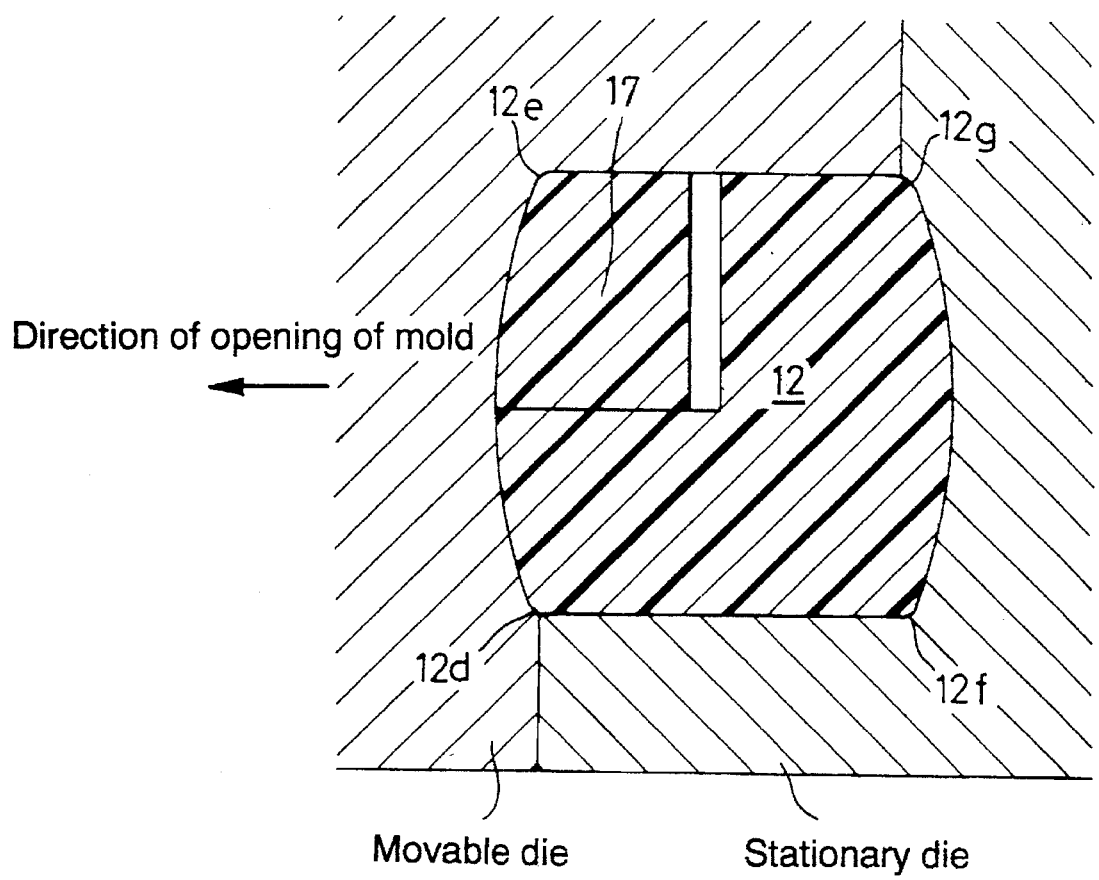
FIG. 15 is a sectional view of a mold for injection molding of the sealing ring.

In producing the sealing ring 12 of the first embodiment shown in FIG. 14 by an injection molding process, the arm 17 is located on the side of the movable die by employing the parting of the mold as shown in FIG. 15. Thus, even if the sealing ring 12 is stuck to the stationary die when the sealing ring 12 is to be separated, together with the movable die, from the stationary die for opening the mold, the sealing ring 12 can be separated from the stationary die without application of any load to the arm 17.

Figure 12B:
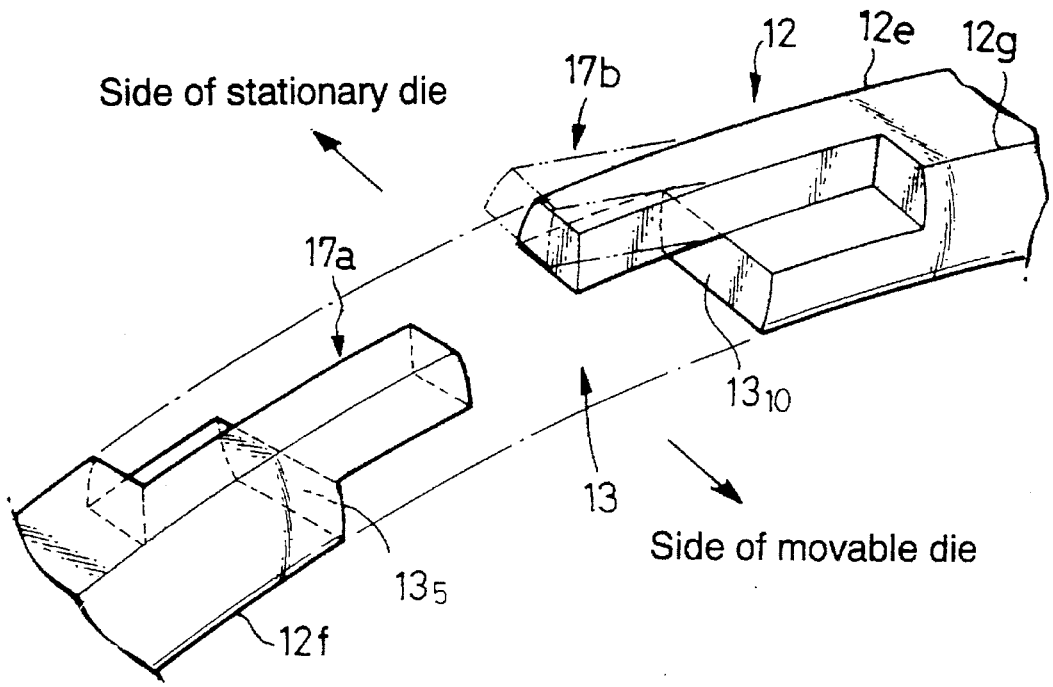

However, if the parting of the mold is established so that the arm 17a is located on the side of the stationary die as in the sealing ring shown in FIG. 12A, there is encountered a problem that when the sealing ring 12 is separated from the movable die and the stationary die in opening the mold, the arm 17a is stuck to the stationary die, whereby the arm 17a is flexed and deformed at a location shown by a dashed line in FIG. 12A. Even if the parting of the mold is established so that the arm 17b is located on the side of the stationary die as shown in FIG. 12B in order to prevent the above problem, there is a problem that in opening the mold, the arm 17b is stuck to the stationary die and flexed at a location shown by a dashed line in FIG. 12B.

Figure 13:
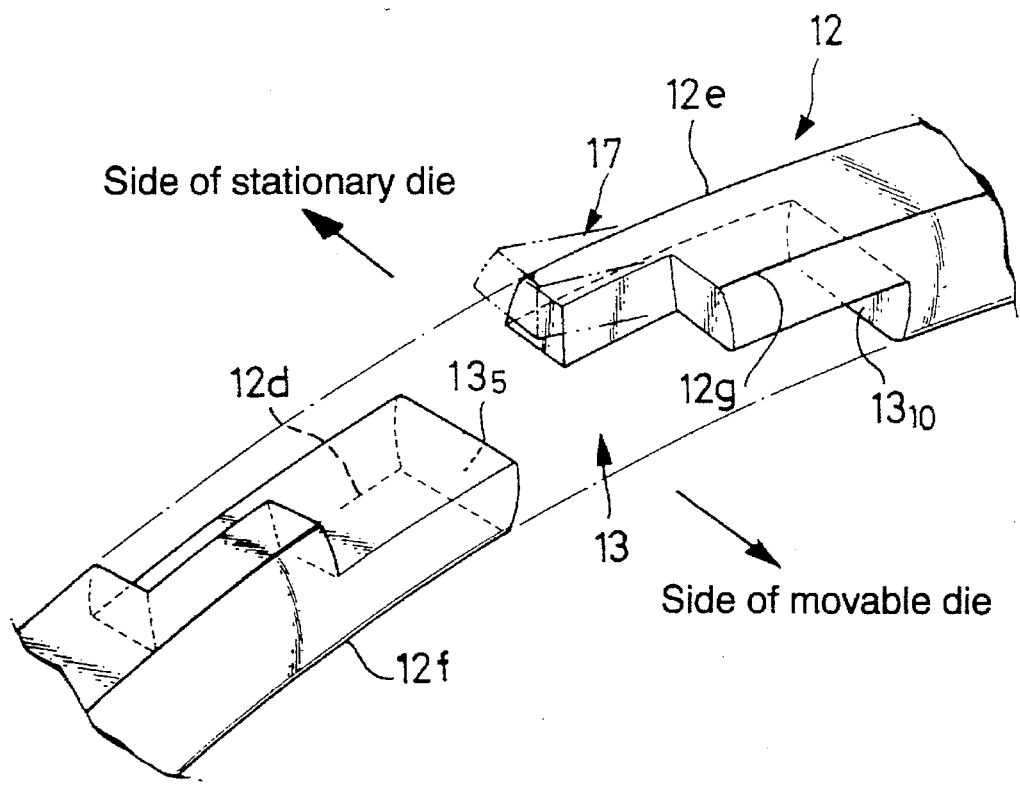

FIG. 13 is a view for explaining the parting of the mold which is established so that the arm 17 is located on the side of the stationary die when the a sealing ring 12 having an abutment 13 of the same shape as the sealing ring 12 in the first embodiment is produced by an injection molding process. Even in this case, there is a problem that the arm 17 which is struck to the stationary die in opening the mold is flexed at a location shown by a dashed line in FIG. 13.

As can be seen from the above description, it is preferable that the arm 17 is formed only at one of the opposite ends of the sealing ring 12 comprising the abutment 13 as in the sealing ring 12 in the present embodiment shown in FIG. 14, and that the arm 17 is located on the side of the movable die.

An effect provided by the sealing ring 12 in the present embodiment will be described below with reference to graphs in FIGS. 16 and 17.

The graph in FIG. 16 shows the amount of wear that occurs when the conventional sealing ring 12 shown in FIG. 12A and the sealing ring 12 of the present embodiment shown in FIG. 14 have been mounted in the sealing ring groove 11 formed in the shaft member 2 made of the aluminum alloy comprising an $ADC_{12}$ material, and the housing 3 has been rotated for 50 hours at 6,500 rpm under conditions of a hydraulic pressure of 12 kg/cm$^2$ and an oil temperature of 120° C. As apparent from this graph, when the deformed arm 17a (the amount the arm 17a is deformed is 0.1 mm) of the conventional sealing ring 12 is opposed to the sealing side 11a of the sealing ring groove 11 (17a+11a), the amount of sealing side 11a wear reaches about 225 μm, whereas when the undeformed arm 17b is opposed to the sealing side 11a (17b+11a), the amount of sealing side 11a wear is about 12 μm. On the other hand, when the sealing ring 12 of the present invention is used, even if either of the ring sides 12a and 12b of the sealing ring 12 is opposed to the sealing side 11a (12a+11a or 12b+11a), the amount of wear of the sealing side 11a is suppressed to 10 μm or less.

The increase in amount of wear generated when the conventional sealing ring 12 shown in FIG. 12A is used is because the deformed arm 17a acts as a projection against the sealing side 11a of the sealing ring groove 11 to cut the oil film between the arm 17a and the sealing side 11a.

The graph in FIG. 17 shows the amount of wear measured under the same conditions as in the graph in FIG. 16, except that an iron powder was contained in the oil. The oil used in this measurement was an oil into which 1.5 g of an iron powder having a particle size of 100 μm or less, 0.03 g of an iron powder having a particle size of 101 to 150 μm, 0.01 g an iron powder having a particle size of 151 to 250 μm, and 0.01 g of an iron powder having a particle size of 251 μm or more were incorporated in 5 liters of the oil.

As is apparent from this graph of FIG. 17, when the deformed arm 17a of the conventional sealing ring 12 is opposed to the sealing side 11a of the sealing ring groove 11 (17a+11a), the amount of sealing side 11a wear is increased to about 320 μm, and when the undeformed arm 17b is opposed to the sealing side 11a of the sealing ring 11 (17b+11a), the amount of sealing side 11a wear is further greatly increased. This is because the conventional sealing ring 12 does not have the clearance in the crank-shaped oil channel 15 and hence, the iron powder in the oil is passed between the slide surfaces of the ring sides 12a and 12b and the sealing side 11a, and during this time, the iron powder sticks into the ring sides 12a and 12b to wear the sealing side 11a.

On the other hand, when the sealing ring of this embodiment is used, even when either of the ring sides 12a and 12b of the sealing ring 12 are opposed to the sealing side 11a of the sealing ring 11 (12a+11a or 12b+11a), the amount of sealing side 11a wear is suppressed to about 10 μm or less. This is because the iron powder is discharged through the crank-shaped oil channel 15.

Although the embodiments of the present invention have been described in detail, it will be understood that the present invention is not limited to the above-described embodiments, and various modifications in design may be made without departing from the spirit and scope of the invention defined in claims.

For example, because the other ring side 12b of the sealing ring 12 does not contribute to the sealing action, the other ring side 12b can be formed into an uncrowned flat surface. In addition, in place of fixing the shaft member 2 and rotating the housing 3, the housing 3 may be fixed and the shaft member 2 rotated.

What is claimed is:

1. A sealing device including a sealing ring for mounting in annular sealing ring groove provided in a recessed manner in an outer periphery of a shaft member on which a housing is relatively rotatably fitted, comprising, a ring inner-peripheral surface facing radially inwardly, a ring outer-peripheral surface facing radially outwardly, a pair of ring sides facing in axially opposite directions, said ring outer-peripheral surface for engaging in pressure contact with a sealing inner-peripheral surface of the housing, and one of said ring sides for engaging in pressure contact with a sealing side of the sealing ring groove by a hydraulic pressure applied to the other ring side, wherein said sealing ring is split at one circumferential point with a mating abutment formed at said point by two separate and relatively movable ends of said sealing ring, said abutment forming a crank-shaped oil channel of restricted cross-section for allowing restricted communication between the opposite ring sides at said ring outer-peripheral surface, said crank-shaped oil channel comprising first and second oil channel portions extending axially to open separately through the opposite ring sides, respectively, and a third oil channel portion located between said opposite ring sides and extending circumferentially to connect said first and second oil channel portions to each other.

2. A sealing device according to claim 1, wherein an opening in said third oil channel portion facing the sealing inner-peripheral surface of said housing is closed by a closing wall extending to said ring outer-peripheral surface.

3. A sealing device according to claim 1, wherein said one ring side in pressure contact with the sealing side of the sealing ring groove is formed into a convex curved surface having a radially central portion increased.

4. A sealing device according to claim 1, wherein the shaft member is made of an aluminum alloy.

5. A sealing device according to claim 1, wherein said sealing ring is made of a synthetic resin.

6. A sealing device according to claim 1, further including an arm circumferentially protruding from one of said ends of said abutment of said sealing ring, wherein said arm is formed by said one ring side, said ring outer-peripheral surface, a wall surface extending halfway between said ring outer- and inner-peripheral surfaces, a wall surface forming said first oil channel portion opening into said one ring side, and a wall surface forming said third oil channel portion, said arm being located at a side of a movable die of a mold which is axially opened and closed for injection molding said sealing ring.

7. A sealing device for mounting in an annular sealing ring groove provided in a recessed manner in an outer periphery of a shaft member on which a housing is rotatably mounted, comprising, a sealing ring having an abutment formed by a split in said sealing ring at circumferentially one point between two separate and relatively movable ends of said sealing ring, said abutment having complementary walls at predetermined spacing forming a restricted oil channel for allowing a restricted flow of oil from one side of said sealing ring to the other side, and said restricted oil channel including an oil channel portion extending circumferentially and formed between opposite sides of said sealing ring by said two ends of said sealing ring.

8. A sealing device according to claim 7, wherein said oil channel portion is enclosed within exterior surfaces of said sealing ring.

9. A sealing device according to claim 7, wherein a ring side of said sealing ring engages in pressure contact with a sealing side of the sealing ring groove, and said side is formed into a convex curved surface.

10. A sealing device according to claim 7, further including an arm circumferentially protruding from one said end of said sealing ring, said arm being formed by one side of said sealing ring, an outer-peripheral surface of said sealing ring, a wall surface extending halfway between said ring outer-peripheral surface and an inner-peripheral surface of said sealing ring, an end wall, and a wall surface forming a portion of said oil channel portion, said arm being located to correspond to the side of a movable die of a mold which is axially opened and closed for injection molding said sealing ring.

* * * * *

UNITED STATES PATENT AND TRADEMARK OFFICE
CERTIFICATE OF CORRECTION

Page 1 of 1

PATENT NO. : 5,660,398
DATED : August 26, 1997
INVENTOR(S) : Terao et al.

It is certified that error appears in the above-identified patent and that said Letters Patent is hereby corrected as shown below:

Column 9,
Line 37, before "annular" insert -- an --.

Column 10,
Line 43, after "and said" and before "side" insert -- ring --.

Signed and Sealed this

Thirteenth Day of August, 2002

Attest:

Attesting Officer

JAMES E. ROGAN
Director of the United States Patent and Trademark Office